United States Patent [19]
Ku

[11] Patent Number: 5,572,856
[45] Date of Patent: Nov. 12, 1996

[54] REMOTELY CONTROLLED LAWN MOWER

[76] Inventor: Chingyu J. Ku, P.O. Box 2432, Sugar Land, Tex. 77487-2432

[21] Appl. No.: 517,285

[22] Filed: Aug. 21, 1995

Related U.S. Application Data

[63] Continuation-in-part of Ser. No. 198,487, Feb. 18, 1994, abandoned.

[51] Int. Cl.$^6$ .......................... A01D 34/64; A01D 34/73; A01D 34/78; A01D 34/84
[52] U.S. Cl. .......................... 56/10.2 A; 56/10.7; 56/10.8; 56/11.9; 56/12.7; 56/16.9; 56/17.5; 56/2
[58] Field of Search .......................... 56/2, 10.2 A, 10.6, 56/10.7, 10.8, 11.9, 12.7, 16.9, 17.5, 13.5; 180/131, 79.1

[56] References Cited

U.S. PATENT DOCUMENTS

| | | | |
|---|---|---|---|
| 3,596,450 | 8/1971 | Bowers | 56/2 |
| 3,664,102 | 5/1972 | Reber | 56/295 |
| 3,800,902 | 4/1974 | Keller | 180/79.1 |
| 4,184,559 | 1/1980 | Rass | 180/131 |
| 4,308,676 | 1/1982 | Doane | 56/16.9 X |
| 4,318,266 | 3/1982 | Taube | 56/10.2 |
| 4,453,372 | 6/1984 | Remer | 56/16.9 X |
| 4,715,169 | 12/1987 | Ould | 56/16.9 |
| 4,825,627 | 5/1989 | Truderung | 56/12.7 |
| 4,905,465 | 3/1990 | Jones et al. | 56/295 |
| 4,909,024 | 3/1990 | Jones et al. | 56/12.7 X |
| 4,964,265 | 10/1990 | Young | 56/10.8 |
| 5,048,278 | 9/1991 | Jones et al. | 56/12.7 |

*Primary Examiner*—Stephen J. Novosad

[57] ABSTRACT

A remotely controlled mower which can be easily converted to an edger, a trimmer and a blower with replaceable kits. The mower is battery powered with two drive motors (16A & B) having gear reducing means to provide rotational energy for propulsion and steering which enables the mower to turn with unlimited angles. Cutting devices for mowing, edging, trimming and blowing device are molded integrally with assemblies for easier attachment. The multiple holes on the assemblies provide a simple way to change cutting heights. Angle drives (54A & B) are used to convert the rotating directions for trimming, edging and mowing. The mower produces no air pollution with low operating noise. The combination of various functions in one remotely controllable mower not only makes lawn maintenance tasks easier but saves homeowners money to purchase and to service different equipments with less space required for storage.

17 Claims, 7 Drawing Sheets

REMOTELY CONTROLLED LAWN MOWER

This is a continuation-in-part of application Ser. No. 08/198,487, Filed 1994 Feb. 18, now abandoned.

BACKGROUND

1. Field of Invention

This invention relates to a remotely controlled lawn mower which can be easily converted to an edger, a trimmer and a blower, all of which are remotely controllable.

2. Description of Prior Art

Several types of remotely controlled lawn mowers have been proposed—for example, in U.S. Pat. Nos. Keller 3,800,902 (1974), Rass 4,184,559 (1980), Taube 4,318,266 (1982) and Young 4,964,265 (1990). Having different designs in steering and sensory systems, these prior arts suffer from a number of disadvantages:

(a) Complex in structure: The above mentioned prior arts require special designs to facilitate movements of the mower. For example, a fairly large control apparatus in U.S. Pat. No. 3,800,902; a sensory system in U.S. Pat. No. 4,184,559 and a three-pulley-and-belt steering system in U.S. Pat. No. 4,964,265. Additional operating parts are also needed in order to make these systems work, such as clutches, pinions, disks, power transmission systems, on-board generators etc.

(b) Heavy in weight: In additional to the above mentioned systems, the prior arts require a gas engine for powering a blade for grass cutting. The weight of an internal combustion engine, a heavy blade assembly, steering and sensory systems with the necessary parts combined far exceeds what battery packs of a reasonable size can handle. This makes it difficult for the mower to move around especially on lawns where resistance is high because of the grass.

(c) Limitation on turning angles: Turning angles in the prior arts are limited, for example, a maximum of 26 to 30 degrees in U.S. Pat. No. 4,318,266 and similar limitations in the others. This makes it difficult to maneuver the mower in tight or curved areas such as around walls, fences, trees and flower beds.

(d) Air and noise pollution: Use of an internal combustion engine as required by the prior arts produces air pollution and is very noisy during operation.

(e) non-convertible functions: None of the prior art propose a mower which can be easily converted to a trimmer, an edger and a blower, all of which are remotely controllable.

Objects and Advantages

Accordingly, several objects and advantages of the present invention which overcome the above discussed disadvantages are:

(a) simpler structure: The present invention uses significantly fewer parts in its structure. No internal combustion engines, pulleys, belts, clutches, disks, pinions, power transmission systems or manual push handles as used by the prior arts are required. The main operating parts of this invention comprise a frame, wheels, motors, cutting means, batteries and a remote control device. Steering, propulsion and grass cutting are powered by batteries and controlled by microswitches. This simplified structure reduces the total weight of the mower.

(b) light and smaller cutting means: A metallic cutting string replaces the traditional blades in this invention. The string is made of braided strands of wires and has a somewhat flattened shape. Each braided strand actually functions as a cutting edge when rotating at a speed of about 3000 times per minute. As a result, it not only cuts more efficiently than a traditional blade does but makes the string more durable because a string has a functional cutting edge of its entire length whereas a traditional blade only has an edge of about 2 inches at its end.

The string is flexible instead of being rigid as traditional blades. This minimizes damages to the strings caused by rocks and other hard objects on the ground during mowing. Such damages are oftentimes the major reason for replacing a blade.

In addition, more than one string can be used at different cutting levels at the same time due to its light weight. This will cut grass into much smaller pieces so that as they fall into the lawn, they will disperse into the grass with better mulching effect.

The metallic string further reduces the mower's weight and does not need any sharpening. It also offers easier and less expensive replacement;

(c) less power required for cutting: The cutting strings are light enough to be driven by a small motor. The total weight of the mower is thus greatly reduced without using an internal combustion engine;

(d) light in weight: The above features of the present invention requires a simpler and lighter housing structure. As a result, this mower weights only a fraction of what an internal combustion engine mower does. This makes it possible to power all the mowing functions by batteries of a reasonable size that are commercially available at a reasonable price;

(e) unlimited turning angle: There is no limitation on turning angles in the present invention. The mower can make 360 degree turns as many times as desired which makes maneuvering the mower rather effortlessly especially in tight or curved areas;

(f) enhanced safety: Grass cutting and movements of the mower in the this invention are controlled by the user at all times. Safety of using this mower is greatly enhanced because cutting will stop immediately whenever the mower stops moving or whenever the user stops attending the remote control transmitter. This makes using this mower as safe as if the user is standing behind the mower and controls it with his/her hands on the push handles all the time;

(g) An one-piece string assembly is also invented for attaching and replacing cutting strings. The string is molded in the string assembly and angled in such way that one string can cut grass at two different levels. This not only doubles the utility of strings but makes replacing them extremely easy;

(h) minimum maintenance: The present invention does not need any tune-up, blade sharpening, lubrication, oil change, filter replacements or periodical checks on the transmission, belts and disks, etc.;

(i) easier and less expensive repairs: Major repairs in the prior arts usually require professional services whereas almost all repairs of this invention can be performed by the user. In addition, the modulized structure in this invention further offers easy do-it-yourself replacement when needed;

(j) environment friendly: The present invention produces no air pollution and is very quiet;

(k) lower manufacturing cost: Manufacturing cost will be lower due to its simpler structure. Packaging, delivery costs will also be lower due to its light weight;

(l) easier handling and storage for users when mowers are not in use due to their light weight;

(m) enclosure of operating parts: Most operating parts in this invention are enclosed and double insulated. This prevents moisture, dirt and other objects from getting inside the mower. This not only provides better protection but increases the dependability of the mower;

(n) it has a round shape which allows easier maneuvering of the mower in tight or curved areas;

(o) body protection: a guard strip around the lower part of the cover of the mower minimizes body damages;

(p) easy operation: The mower operates just like playing a remote control model car. With its new design and easy operation, almost anyone can mow a lawn with ease;

(q) less build-ups of grass clippings underneath the mower: A specially designed curved rim at the bottom of the mower helps prevent build-ups in order to produce better mulching effect and to reduce the need of cleaning;

(r) versatility: the mower in this application can be easily converted to an edger, a trimmer and a blower all of which are remotely controllable. This not only makes lawn maintenance tasks easier but saves homeowners money to purchase and to service different equipments with less space required for storage.

Further objects and advantages of my invention will become apparent from a consideration of the drawings and ensuing description.

Reference Numerals In Drawings

| | |
|---|---|
| 10 - frame | 12 - cover |
| 14 - drive wheels A & B | 16 - drive motors A & B |
| 18 - motor | 20 - cutting string |
| 22 - battery pack | 24 - guiding wheels A & B |
| 26 - remote control transmitter | 27 - control stick |
| 28 - remote control receiving module | 32 - servo |
| 33 - servo horn | 34 - receiver |
| 36 - battery pack | 38 - guard strip |
| 40 - antenna | 42 - motor shaft |
| 44 - curved rim | 46 - flange |
| 48 - string assembly | 50 - screw |
| 52 - hollow wheel axis | 54 A & B - angle drive |
| 55 - drive P, Q, R, S | 56 - extension stick |
| 58 - trimming device | 59 - trimming assembly |
| 60 - edging device | 61 - edging assembly |
| 62 - blowing device | 63 - blowing assembly |
| 66 - bolts and nuts | 67 - fan blades |
| 68 - trimming string | 69 - edging string |

DESCRIPTION—FIGS. 1 TO 10

Figure 1:
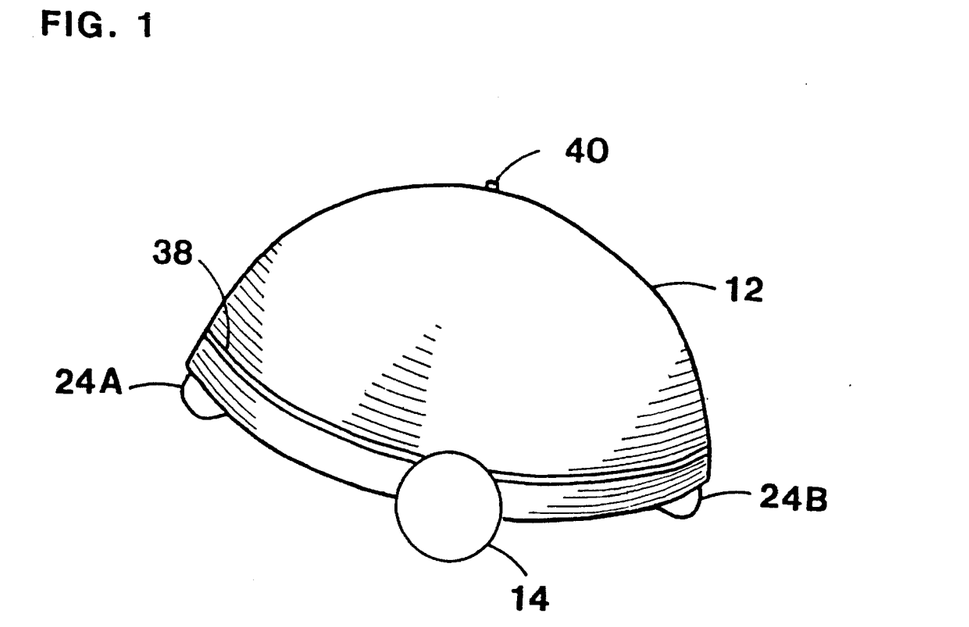
FIG. 1—A perspective view of the mower

FIGS. 1 is a perspective view of the mower. A round convex cover 12 is made of rigid and waterproof materials to protect the operating parts inside. An antenna 40 is located at the top of cover 12. A guard strip 38 of approximately 1.2 centimeters wide (½ inch) is attached around the lower part of cover 12 to protect the mower from body damages. The description of a drive wheel 14 and guiding wheels 24 A & B are detailed in the following paragraph.

Figure 2:
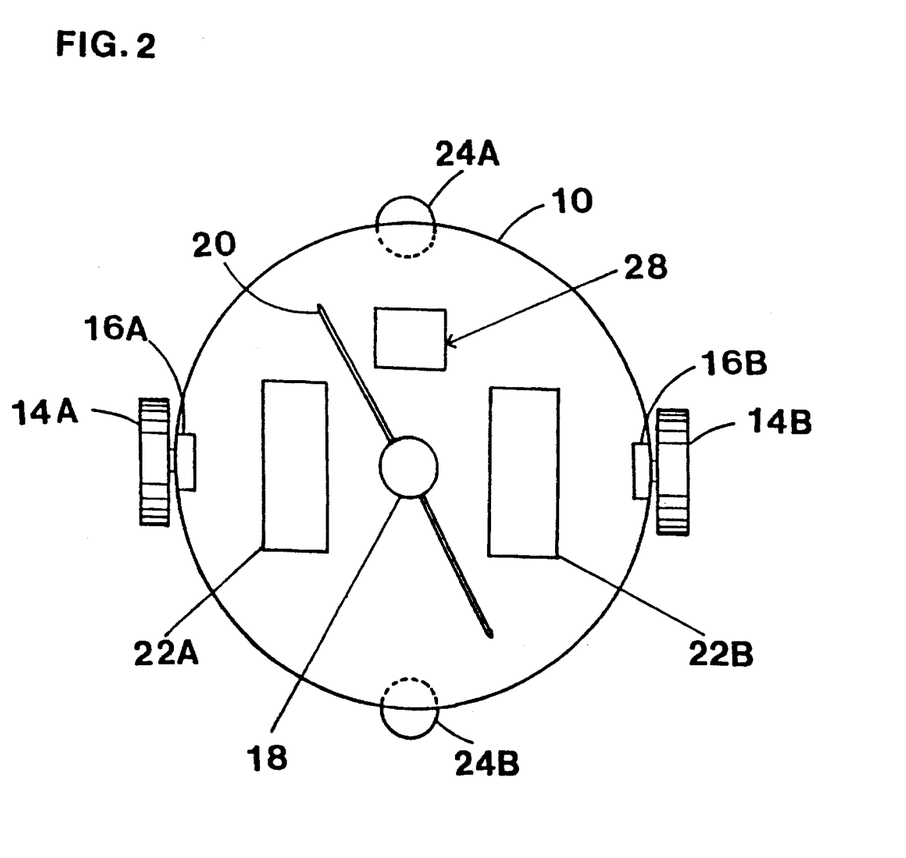
FIG. 2—A layout of operating parts

FIG. 2 is a top view of the operating parts inside cover 12 which is mounted to a frame 10 by screws and brackets. Frame 10 has a diameter of about 56 centimeters (22 inches) and is made of light materials such as aluminum or plastic to support the mower.

Two drive motors 16 A & B with gear reducing means are mounted on the opposite sides of frame 10 by screws. Each drive motor 16 is connected to a drive wheel 14 by a coupler. Drive wheels 14 A & B have a diameter of about 15 centimeters (6 inches) to move the mower to the desired directions at a predetermined speed. Drive motors 16 A & B are 12 volt direct current motors with gear reducing means which rotate about 20 times per minute. This will move the mower for about half a foot per second accordingly.

Two guiding wheels 24 A & B having a height of about 8 centimeters (3 inches) are also mounted to frame 10 by screws. They are located 90 degrees from each drive wheel 14 A & B respectively to further support the mower. Guiding wheels 24 A & B are free spinning caster wheels which make turns easilier on grass than conventional wheels do.

A rotational motor 18 powered by batteries is mounted at the center of frame 10. Motor 18 rotates about 3000 times per minute. A cutting string 20 is secured to its shaft.

A remote control receiving module 28 is mounted on frame 10 by using a holder and screws. It receives commands from a hand held remote control transmitter to direct grass cutting and mower movements.

Two battery packs 22 A & B with re-chargeable power cells are secured to frame 10 by using battery holders and screws. It provide power needed for grass cutting and mower movements. Battery packs 22 are connected to motor 18 and remote control receiving module 28 by wires.

A battery charger is physically separate from the mower for charging battery packs 22 A & B. Any chargers commonly used in the industry will do. Thus, it is not a consideration of the present invention.

Figure 3:
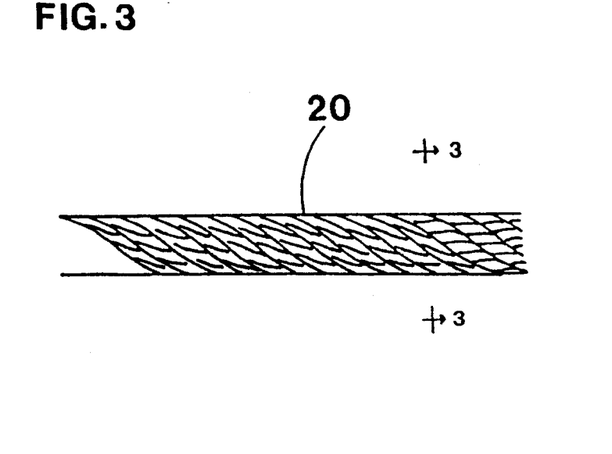
FIG. 3—A plane view of a metallic cutting string
Figure 4:
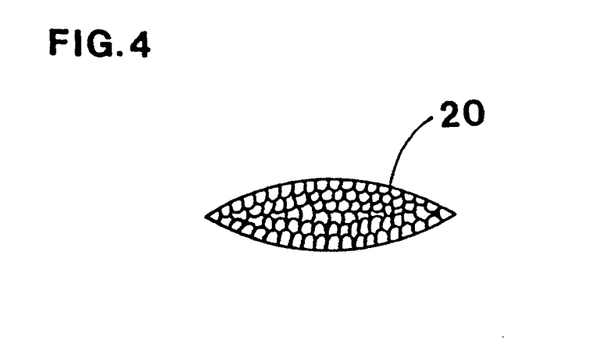
FIG. 4—A cross sectional view of a cutting string

FIG. 3 is a plane view of a metallic cutting string 20 which is about 45 centimeters (18 inches) long. Cutting string 20 is made of braided strands of wires and has a somewhat flattened shape as shown in FIG. 4. These strings cut more efficiently than traditional blades do because each braided strand actually functions as a cutting edge when rotating at a speed of about 3000 times per minute. They are also more durable because each string has a cutting edge of its entire length whereas a traditional blade only has an edge of about 2 inches at its end.

Cutting string 20 is flexible instead of being rigid as traditional blades. This minimizes damages to the strings caused by rocks and other hard objects on the ground during mowing. Such damages are oftentimes the major reason to replace a blade.

In addition, more than one string can be used at different cutting levels at the same time due to its light weight. This will cut grass into much smaller pieces so that as they fall into the lawn, they will disperse into the grass with better mulching effect.

FIG. 4 is a cross sectional view of cutting string 20 taken along line 3—3 in FIG. 3. Its measurement is about 0.4 centimeters wide by 0.1 centimeters high (½ by ¹⁄₂₄ inch).

Figure 5:
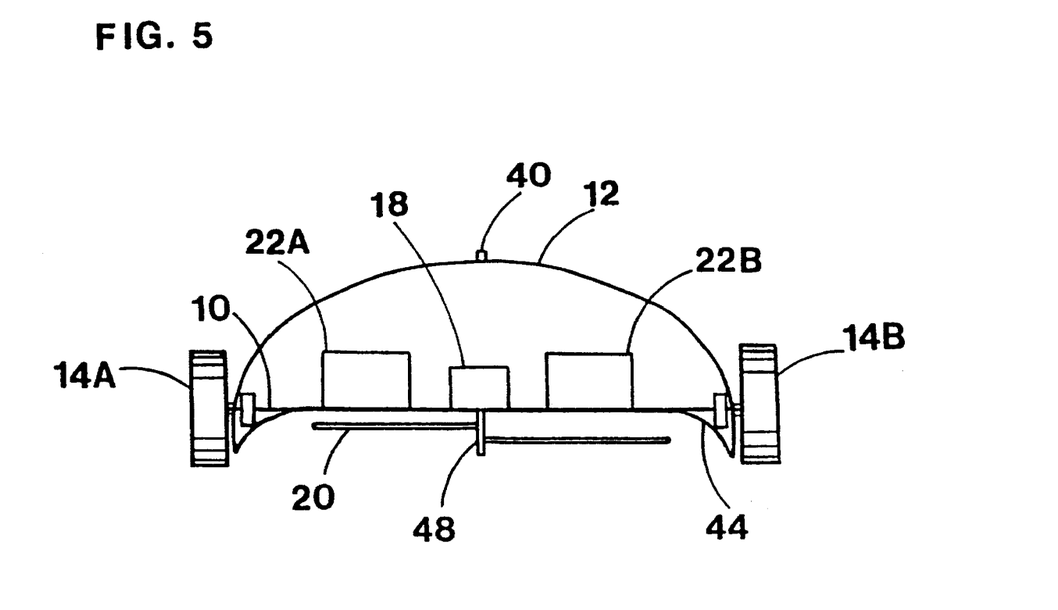
FIG. 5—A vertical sectional view of the mower
Figure 6:
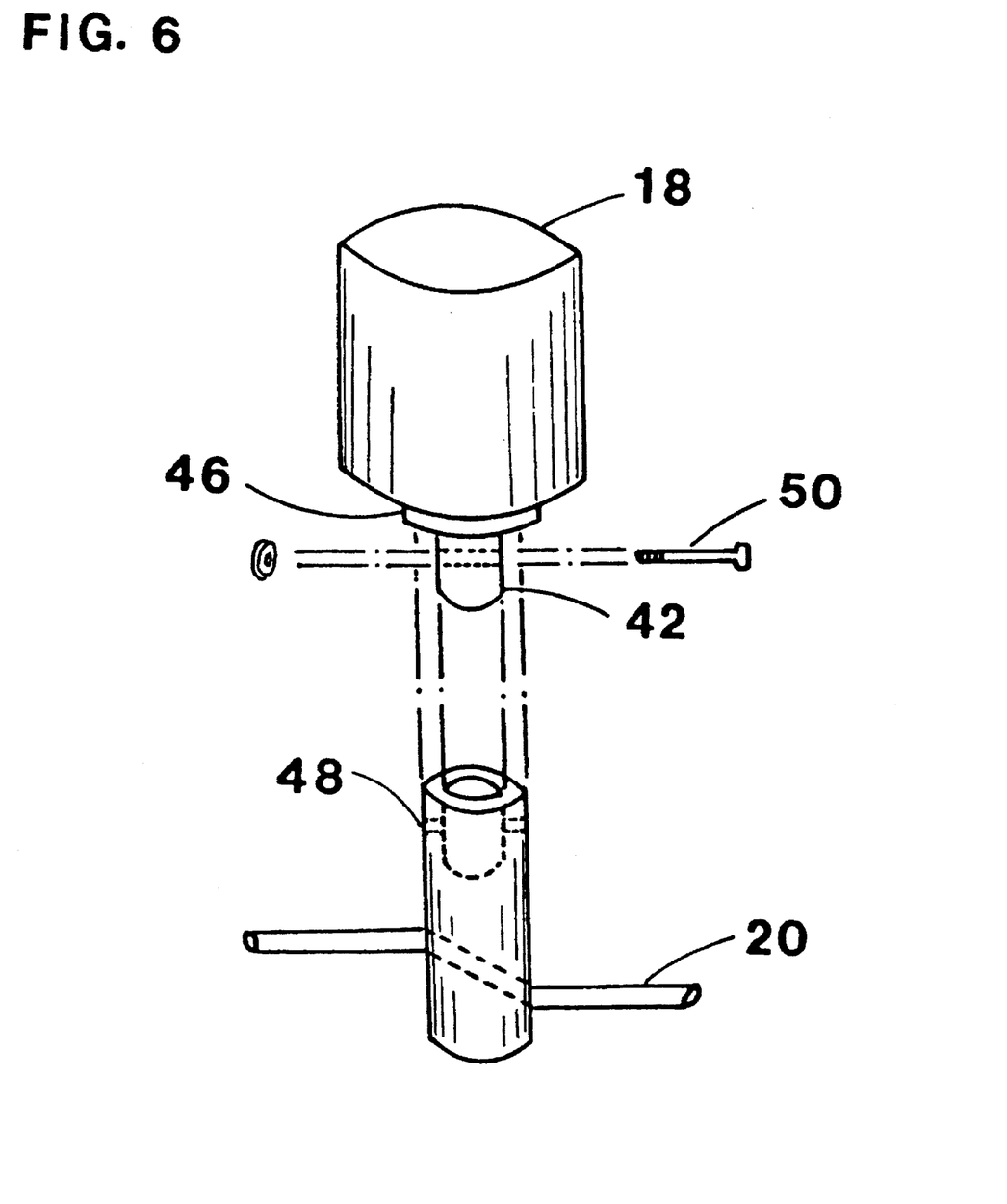
FIG. 6—A perspective view of a string assembly

FIG. 5 is a vertical sectional view of the mower. A curved rim 44 is soldered to frame 10 and cover 12 as shown in the figure. This prevents build-ups of grass clippings underneath the mower. The space enclosed by cover 12, frame 10 and curved rim 44 is double insulated for better protection. Cutting string 20 is secured to the shaft of motor 18 through a string assembly 48 with detailed descriptions in the following:

FIG. 6 is a perspective view of string assembly 48. String assembly 48 is an one-piece molded plastic construction with a cutting string 20 embedded in the mold as shown in the figure. The string is angled in such way that it can function as two strings at different cutting levels. This not only doubles the utility of one string but will cut the grass into much smaller pieces so that as they fall into the lawn, they will disperse into the grass with better mulching effect.

String assembly 48 has a hollow center on the top which matches the size of motor shaft 42 of motor 18. To attach the string assembly 48, simply insert motor shaft 42 into the hollow center of string assembly 48 until the string assembly meets a flange 46 at the bottom of motor 18. A screw 50 is used to secure both string assembly 48 and motor shaft 42 through the holes on both of them. The mower is then ready to mow the lawn. To replace a worn string, simply remove screw 50, gently pull the string assembly away from flange 46. A new string assembly can then be replaced.

String assembly 48 is disposable because it can be manufactured at very low cost. This makes replacing cutting strings extremely easy. In addition, height adjustments may also be done by using string assemblies with strings embedded at different heights instead of having height adjustment devices installed permanently on the mower. This will keep the unnecessary loads off the mower.

Figure 7:
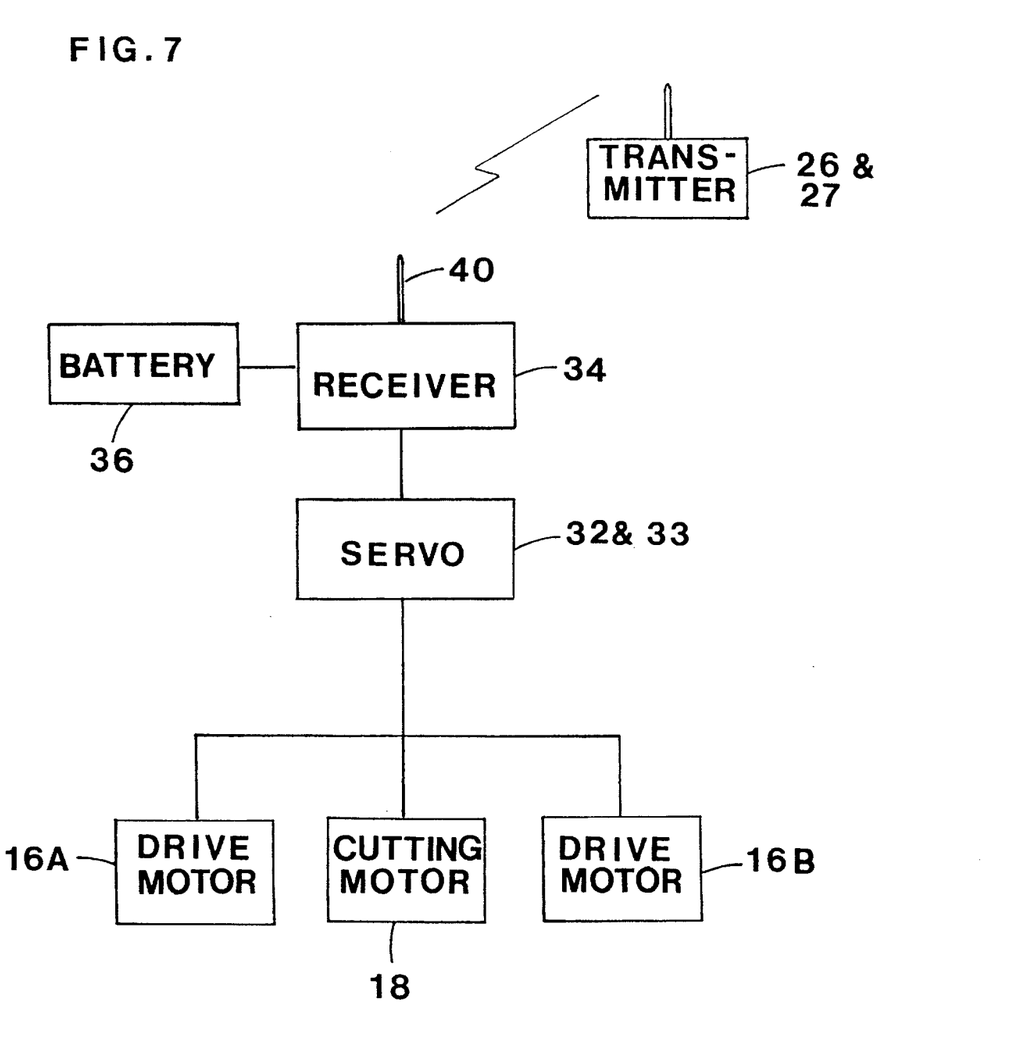
FIG. 7—A diagram of the remote control functions

FIG. 7 is a diagram illustrating the remote control functions in the present invention. A hand held remote control transmitter 26 is used to send radio wave signals to remote control receiving module 28. Remote control transmitter 26 has a control stick 27 to send cutting and steering commands to move the mower forward, backward, left and right.

Remote control receiving module 28 comprises a smaller battery pack 36, an antenna 40, a receiver 34, a servo 32 with a servo horn 33.

Battery pack 36 is connected to receiver 34 by wire to provide power for the module. Antenna 40 and receiver 34 receive signals from remote control transmitter 26. Servo 32 and servo horn 33, both connected to receiver 34 by wire are to open or close predetermined micro-switches, which are connected to drive motors 16 A & B and cutting motor 18 by wire, to execute commands from the user. A number of single pole double throw and two double pole double throw micro-switches with armatures, levers, or leaves are used in the circuits.

Figure 8:
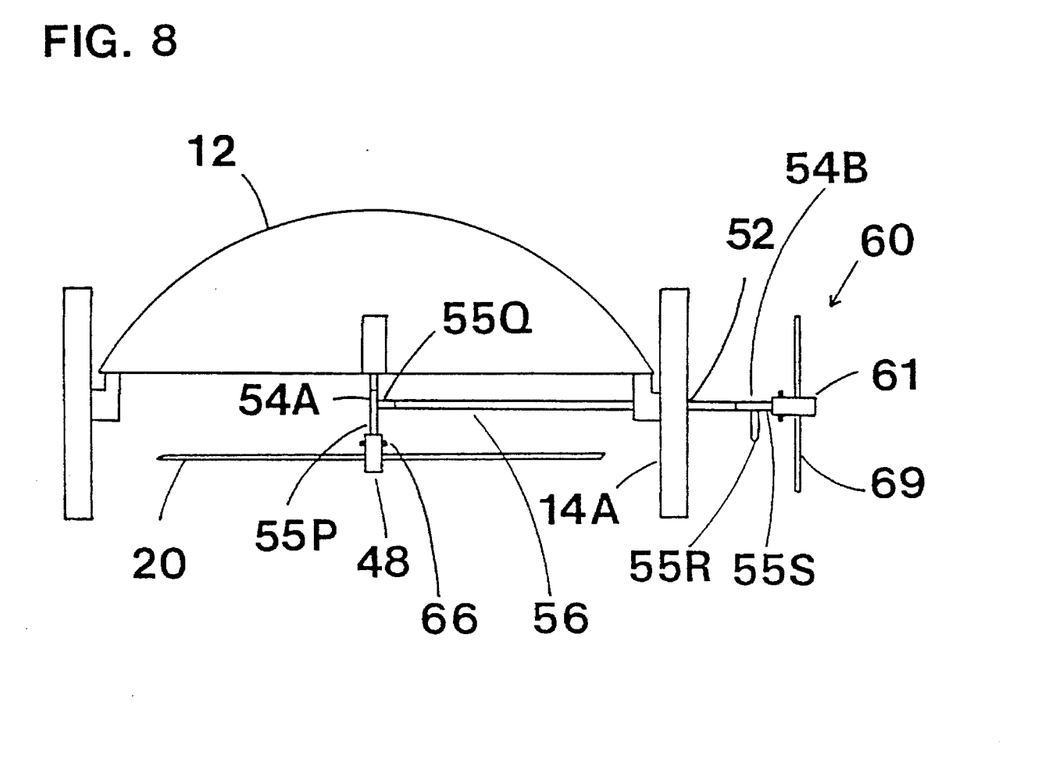
FIG. 8—A vertical sectional view of an edging device.
Figure 9:
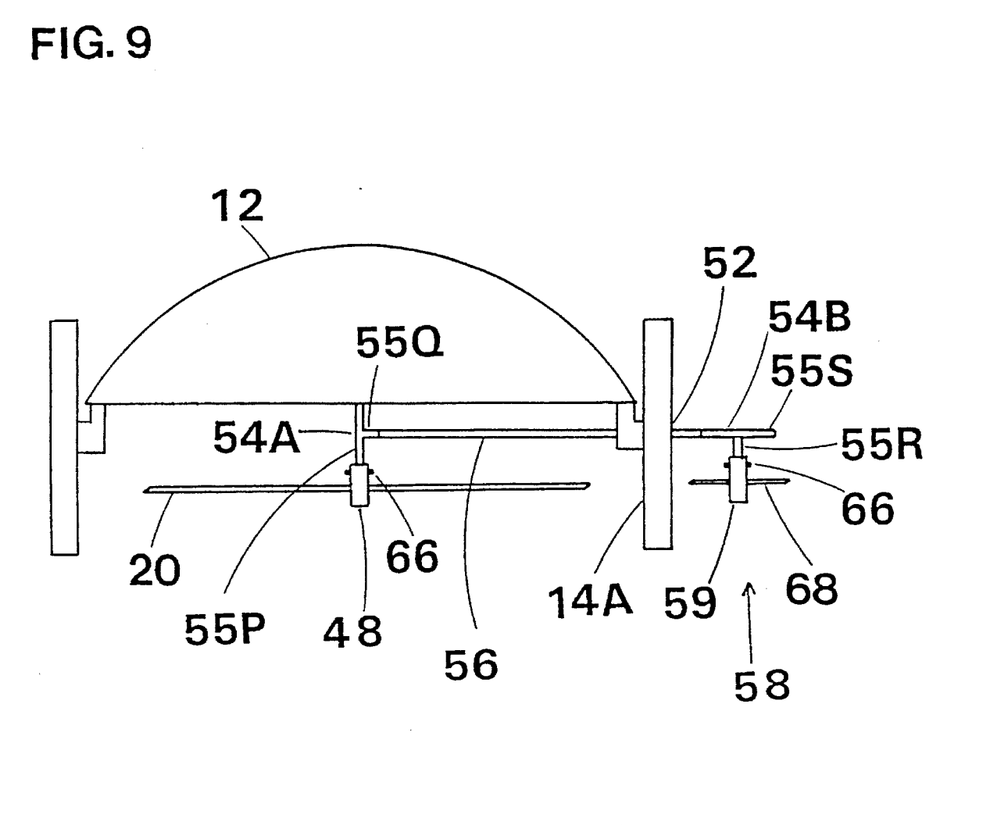
FIG. 9—A vertical sectional view of a trimming device.
Figure 10:
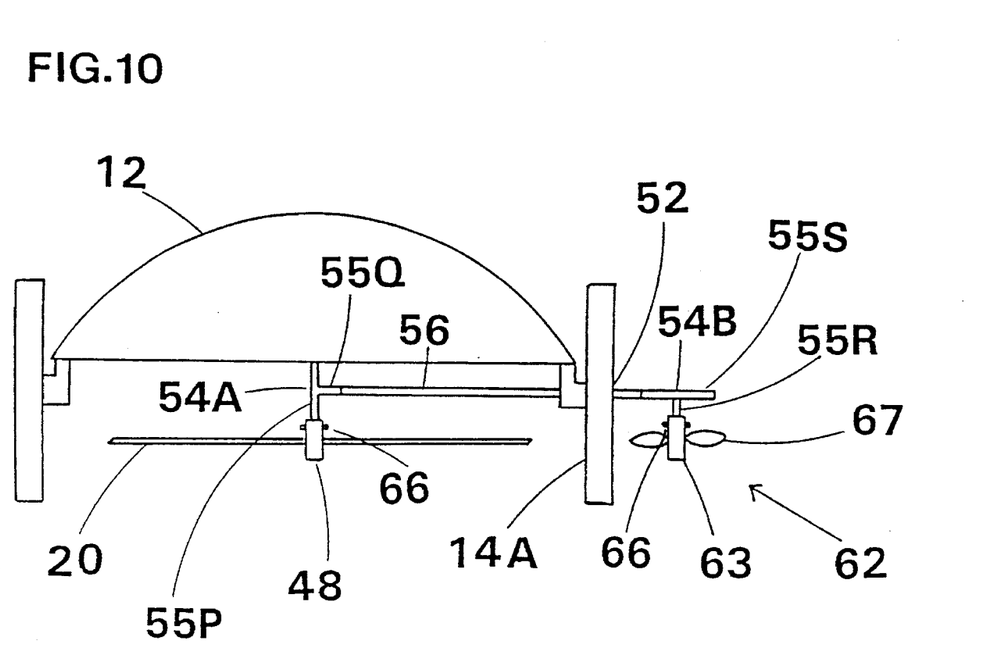
FIG. 10—A vertical sectional view of a blowing device.

FIGS. 8 to 10 show an alternate embodiment of the mower in this application which can be easily converted to an edger, a trimmer or a groomer, and a blower. A right angle drive 54A with dual drives, or a bevel gear drive with dual drives, is permanently mounted on shaft 42 of cutting motor 18 to rotate drives P 55P and Q 55Q through battery pack 22.

Drive P 55P rotates horizontally and drive Q 55Q rotates vertically. Drives P and Q have different predetermined speeds, or speed ratios, which can change the speed of cutting motor 18 to a higher or lower rate when attached. For example, motor 18 has a 3000 rotation per minute rate and drives P and Q have a 1 to 3 ratio. When angle drive 54A is attached to shaft 42 of motor 18, drive P 55P will rotate 3000 times per minute horizontally for mowing and drive Q will rotate 9000 times per minute vertically for edging.

The shape, weight and material cutting devices are made of determine the speed of each drive to function effectively.

Drive P 55P has pre-drilled holes at its end for mounting in the same way as shaft 42 shown in FIG. 6.

String assembly 48 is a one-piece molded plastic construction with multiple cutting strings 20 embedded in the mold with details shown in FIG. 6. Cutting string 20 is about 50 centimeters (20 inches) long.

String assembly 48 is about 5 centimeters (2 inch) long with a hollow center on the top which matches the size of drive P 55P. Assembly 48 also has multiple holes on its top for mounting. To attach string assembly 48, insert drive P into the hollow center of string assembly 48 and secure the assembly to drive P with bolts and nuts 66 through the holes on both of them.

The multiple holes on string assembly 48 also serve as a cutting height adjuster. To adjust cutting heights, select holes at different locations on string assembly 48 to be mounted on drive P to lower or raise cutting strings 20. This enables the user to determine cutting heights without having to use a separate height adjuster or change the wheel height.

Where a blade is used for mowing, it can be mounted on drive P 55P by washers and nuts in the same way as most of the mowers currently available in the market.

When the mower is turned on, drive P 55P rotates horizontally to mow the lawn. Turning on and off the mower and moving the mower about the lawn are remotely controlled through remote control transmitter 26.

An extension stick 56 having a diameter of about 0.3 centimeter (⅛ inch) and a length of about 42 centimeters (17 inches) is permanently mounted on drive Q 55Q of angle drive 54A.

Drive motors A and B 16A & B are connected to drive wheels 14A & B by sprocket and chains, or by a belt-and-pulley system, to move drive wheels. A sprocket with a bore size matching the diameter of the shaft of drive motor is mounted on the shaft of drive motor.

A hollow wheel axis 52 of about 5 centimeters (2 inches) long is mounted at the center of drive wheel 14A and has an inside diameter matching the diameter of extension stick 56. The width of drive wheel 14 is about 3 centimeters (1 inch). Hollow wheel axis is mounted through the center of drive wheel with one end flush with the outside rim of wheel 14A.

A second sprocket with a bore size matching the outside diameter of hollow wheel axis 52 is mounted on hollow wheel axis 52 inside drive wheel 14A towards the body of the mower.

Sprockets are connected by chains. When drive motor 16 is turned on, sprocket mounted on drive motor rotates to move the second sprocket mounted on drive wheel through the chains connected between them to move drive wheel forward or backward.

Extension stick 56 is placed through hollow wheel axis 52 with a length of about 8 centimeters (3 inches) sticking outside drive wheel 14A for attaching cutting devices.

A second right angle drive 54B with dual drives is permanently mounted on the outer end of extension stick 56. Drive R 55R will rotate horizontally and drive S 55S rotate vertically through battery pack 22 when the mower is turned on. These drives may have different speeds for rotating different cutting devices effectively. Both drives have holes pre-drilled at their ends for mounting.

An edging device 60 has an edging assembly 61 in a one-piece molded plastic construction with multiple edging strings 69 embedded in the mold. Each edging string 69 is about 10 centimeters (4 inches) long.

Edging assembly 61 is about 3 centimeters (1 inch) long with a hollow center on the top which matches the size of drive S 55S. Assembly 61 also has multiple holes on its top for mounting. To attach the edging assembly 61, insert drive S into the hollow center of assembly 61 and secure the assembly to drive S with bolts and nuts 66 through the holes on both of them.

Where a blade is used for edging, it may be mounted direct to drive S 55S by using washers and nuts in the same way as blades are mounted on most mowers and edgers currently available in the market.

When the mower is turned on, drive S rotates edging device 60 vertically for edging grass along the sidewalks, flower beds and driveways.

FIG. 9 shows a trimming or grooming device 58 mounted on drive R 55R. A trimming assembly 59 is a one-piece molded plastic construction with multiple trimming strings 68 embedded in the mold. Each string 68 is about 10 centimeters (4 inches) long.

Trimming assembly 59 is about 5 centimeters (2 inch) long with a hollow center on the top which matches the size of drive R 55R. Assembly 59 also has multiple holes on its top for mounting at different heights. To attach assembly 59, insert drive R into the hollow center of assembly 59 and secure the assembly to drive R with bolts and nuts 66 through the holes on both of them.

When the mower is turned on, drive R 55R rotates trimming device 58 horizontally for trimming grass along walls and fences.

FIG. 10 shows a blowing device 62 which has fan blades 67 and a blowing assembly 63. Blowing assembly 63 is a one-piece molded plastic construction with multiple fan blades 67 embedded in the mold. Each blade 67 is about 5 centimeters (2 inches) long.

Blowing assembly 63 is about 3 centimeters (1 inch) long with a hollow center on the top which matches the size of drive R 55R. Assembly 63 also has multiple holes on its top for mounting. To attach assembly 63, insert drive R into the hollow center of assembly 63 and secure the assembly to drive R with bolts and nuts 66 through the holes on both of them. Fan blades 67 can also be mounted direct to drive R 55R by washers and nuts.

When the mower is turned on, drive R 55R will rotate blowing device 62 horizontally to blow the debris on the ground.

Operation—FIGS. 7 to 10

By gently pushing control stick 27 to the direction desired, radio wave signals are sent from remote control transmitter 26 to antenna 40 and receiver 34 in the receiving module. Servo 32 responds to the signals received and rotates servo horn 33 to a predetermined position which strikes the armatures of the corresponding micro-switches to complete the circuit. Drive motors 16 A & B connected to the corresponding micro-switches will then move to the desired directions accordingly.

Four circuits are constructed for steering the mower forward, backward, right and left. Changing direction of drive motor 16 is done by simply switching the wire leads of a double pole double throw micro-switch connected to each drive motor 16. The combination of forward and backward of drive motors 16 A & B makes four directions as follows:

| Drive motor A | forward | forward | backward | backward |
|---|---|---|---|---|
| Drive motor B | forward | backward | forward | backward |
| Direction of mower | forward | right | left | backward |

There is no limitation on turning angles of the mower as a result of the above mechanism. The mower can make 360 degrees turns as many times as desired by the user. This allows much easier maneuvering of the mower in tight or curved areas.

The user will gently push control stick 27 to direct the mower and keeps stick 27 pushed for the mower to continue moving. Control stick 27 will automatically return to the "stop" position when the user lets go of it and mower will stop moving immediately.

Motor 18 with cutting string 20 is also connected to the steering circuits. The mower will start cutting when it starts moving regardless of its direction and stops immediately when it stops moving or when the user releases control stick 27. This safety feature is designed to make operating this mower as safe as if the user is standing behind the mower and controls it with his/her hands on the push handles all the times.

When the mower is turned on, drives P, Q, R, S will be rotating at predetermined speeds. Drives P and R rotate horizontally for mowing, trimming and blowing, and drive S rotates vertically for edging.

To edge, insert drive S 55S into edging assembly 61 and secure assembly 61 to drive S 55S with bolts and nuts 66 through the holes on both of them. The user will control the mower through remote control transmitter 26 and move the mower along the driveways, sidewalks and flower beds to edge grass vertically.

It is suggested that homeowners mow the lawn first before edging or trimming to minimize the resistance from grass as mower moves about the lawn.

To trim, attach trimming assembly 59 to drive R 55R at the same cutting height as mowing blade or cutting strings 20 to ensure even grass height. Secure trimming assembly 59 to drive R 55R by bolts and nuts 66 through the holes on both of them. Drive R 55R rotates horizontally to trim. The user will move the mower through remote control transmitter 26 along the fences and walls to trim grass.

To blow, attach blowing assembly 63 to drive R 55R which rotates horizontally for blowing. Secure blowing assembly 63 to drive R 55S with bolts and nuts 66 through the holes on both of them. Move the mower through remote control transmitter 26 to blow debris on the driveways and sidewalks.

Summery, Ramifications, And Scope

Thus the reader will see that the remotely controlled mower in this invention is light and easy to use. It could also be fun to use because it operates just like playing a remote controlled model car. Almost anyone can mow a lawn with ease by using this mower. Furthermore, the mower has additional advantages in that

• it cuts more effectively and mulches better due to the use of lighter metallic cutting strings at different levels.

• its cutting strings are more durable due to the length of its functional edge.

• it is easy to maneuver in tight or curved areas due to its round shape and unlimited turning angle.

- it is completely free of air pollution and it is quiet.
- its enhanced safety feature makes using this mower as safe as if the user is standing behind the mower and controls it with his/her hands on the push handles all the time.
- its one-piece string assembly molded with strings cutting at different levels not only makes the cutting more efficient but offers an extremely easy way to replace worn strings.
- its simple structure reduces manufacturing cost; its light weight further lowers the handling and delivering costs.
- it requires no routine maintenance such as tune-up, blade sharpening, filter replacement, oil change, lubrication or periodical checks on pulley, belts, disks and transmission systems, etc.
- its simple structure makes repair and replacement easier at lower cost when needed.
- most of its operating parts are enclosed and double insulated for better protection and increased dependability.
- less build-ups of grass clippings underneath the mower due to its curved rim at the bottom.
- its guard strip around the lower part of the cover minimizes body damages.
- handling and storage for users are easier when mowers are not in use due to its light weight.
- Weights or other devices can be added to the mower for stabilizing the mower in areas having a slope in order to prevent mower from tipping over during mowing.
- the angle drive may have drives rotate at a 45 degree or other desired angles to enable the drives to trim or edge at a non-horizontal and a non-vertical angle. In addition, devices can be developed to enable homeowners to freely adjust the cutting angles. As a result, trimming, edging and blowing can be performed from the same drive.
- devices can be developed to turn off drives not in use to allow only one drive to rotate for saving energy.
- the mower in this application can be modified to be a thatcher.
- in order to mow effectively in larger areas, the mower may have multiple cutting motors with multiple mowing devices attached in a predetermined shape such as an elongated shape, a triangular shape, etc. Where an elongated shape is used, the cross axis between the drive wheels can be contracted and users can change the mower's length through remote control devices to easily move mower in areas where flower beds and trees are located in an irregular fashion.
- cutting height can be adjusted by raising or lowering the cutting motor from above or outside the mower to make adjustment easier.

Although the description above contains many specificities, these should not be construed as limiting the scope of the invention but as merely providing illustrations of some of the presently preferred embodiments of this invention. Many other variations are possible. Some of the examples are:

The mower can have different shapes. More than one cutting string can be used at the same time to achieve desired cutting and mulching effects. The strings can be made of different materials in different shapes to suit different mowing needs.

Remote control circuits can be constructed on a compact circuit board or integrated circuits to reduce its size.

The wheels of the mower can be replaced by tracks in order to work effectively in rough terrains.

The remote control devices can be operated by radio wave, infrared or light beam, etc. whereby desired controls can be achieved through the best possible way in different mowing situations.

The motors in the present inventions can be operated by portable energy sources such as batteries, compressed air or solar energy, etc.

Alternate current motors powered by household electricity can be used with some modifications to the mower, except this will make the mower a wired device instead of being wireless.

By regulating the voltage of the power source, the mower's speed can be varied.

A further safety feature can be added by using a sensory device to stop the mower immediately when it detects any separation between the string assembly and motor shaft.

This mower can be converted to an edger, a vacuum cleaner with bumper sensors, a leaf blower, a debris or leaf collector, a polisher or a floor waxer, etc. where repetitive motion type work on a fairly plane surface is needed.

Accordingly, the scope of the invention should be determined not by the embodiments illustrated, but by the appended claims and their legal equivalents.

I claim:

1. A remotely controlled mower comprising:
   (a) a frame
   (b) a pair of drive wheel means mounted on the right and left sides of said frame for providing propelling and steering functions,
   (c) a pair of gear reducing motor means, each of which is connected to a drive wheel means and operates independently in its rotating directions, for said mower to go forward, backward and to turn to any directions desired with unlimited turning angles,
   (d) electric motor means mounted on said frame for producing rotational energy to cut grass,
   (e) cutting means for cutting grass,
   (f) power means for providing energy to operate said mower,
   (g) control means for remotely controlling mower functions and movements,
   whereby a user can mow lawns by remotely controlling said mower and convert it to an edger, a trimmer and a leaf blower.

2. The mower of claim 1 wherein said frame has a curved rim for preventing buildup of grass clippings underneath said mower.

3. The mower of claim 1 wherein said drive wheel means are replaced with track means for enabling said mower to move in rough terrains.

4. The mower of claim 1, further including free spinning supporting wheel means for additional support to said frame when needed.

5. The mower of claim 1 wherein said mower has more than one cutting means located at different cutting heights in different directions for more efficient cutting and better mulching.

6. The mower of claim 5 wherein said cutting means are made of metallic materials such as braided strands of wires.

7. The mower of claim 5 wherein said cutting means are made of non-metallic materials such as plastic strings.

8. The mower of claim 5 wherein said cutting means have a predetermined shape with edges for producing cleaner cuts.

9. The mower of claim 1 further including an assembly means having an elongated body with a hollow center and holes on the top in order to be secured onto the shaft of said electric motor means by screw means.

10. The mower of claim 9 wherein said cutting means are molded integrally with said assembly means at predetermined locations for easy attachment and replacement.

11. The mower of claim 9 wherein cutting heights are easily set by adjusting the cutting level of said cutting means on said assembly means whereby no additional height and wheel adjustment devices are needed.

12. The Mower of claim 1, further including an angle drive means with multiple drives for converting the rotating directions to different angles whereby various cutting means can be attached to the appropriate drives for mowing, trimming, edging and blowing.

13. The Mower of claim 12 wherein said angle drive means is mounted on the shaft means of cutting motor means and has one drive rotating horizontally for attaching mowing means and the other drive rotating at a desired angle for trimming, edging and blowing.

14. The Mower of claim 12 further including an extension means having a predetermined length attached to said other drive.

15. The Mower of claim 14 further including a second angle drive means, which is mounted on the outer end of said extension means, having drives with holes on their ends for mounting and rotating at desired angles for edging, trimming and blowing.

16. The Mower of claim 12 further including an edging assembly means, a trimming assembly means and a blowing assembly means, each of which has an elongated body with a hollow center and multiple holes on its top to be secured to the drives by bolt and nut means.

17. The mower of claim 12 further including multiple strings means and fan blade means molded with said edging, trimming and blowing assembly means integrally at predetermined locations for easy attachment.

* * * * *

UNITED STATES PATENT AND TRADEMARK OFFICE
CERTIFICATE OF CORRECTION

PATENT NO. : 5,572,856
DATED : November 12, 1996
INVENTOR(S) : Ku. Chingyu J.

It is certified that error appears in the above-indentified patent and that said Letters Patent is hereby corrected as shown below:

Col. 10, line 31, Claim 1, item (c), change "turn to any directions desired with unlimited turning angles" to --move to any directions desired--.

Col. 10, line 33, Claim 1, item (d), delete "electric".

Col. 10, line 39, Claim 1, item (g), change "mower functions and movements" to --said mower--

Signed and Sealed this

Twenty-ninth Day of April, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,572,856

DATED : Nov. 12, 1996

INVENTOR(S) : KJ. CHINGYU J.

It is certified that error appears in the above-indentified patent and that said Letters Patent is hereby corrected as shown below:

Col. 10, line 67, Claim 9, delete "electric".

Signed and Sealed this

Twentieth Day of May, 1997

*Attest:*

BRUCE LEHMAN

*Attesting Officer*   Commissioner of Patents and Trademarks